(12) United States Patent
Xu et al.

(10) Patent No.: US 7,787,198 B1
(45) Date of Patent: Aug. 31, 2010

(54) LENS BARREL ASSEMBLY

(75) Inventors: Jing Xu, Irvine, CA (US); Roman C. Gutierrez, Arcadia, CA (US); Davy Tong, Temple City, CA (US); Robert J. Calvet, Pasadena, CA (US)

(73) Assignee: Tessera MEMS Technologies, Inc., Arcadia, CA (US)

( * ) Notice: Subject to any disclaimer, the term of this patent is extended or adjusted under 35 U.S.C. 154(b) by 0 days.

(21) Appl. No.: 11/848,933

(22) Filed: Aug. 31, 2007

(51) Int. Cl.
G02B 7/02 (2006.01)

(52) U.S. Cl. .................. 359/819; 359/821; 359/822; 359/823

(58) Field of Classification Search ......... 359/819–824, 359/694–700
See application file for complete search history.

(56) References Cited

U.S. PATENT DOCUMENTS

| | | | | |
|---|---|---|---|---|
| 4,496,217 A | * | 1/1985 | Aoyagi | 359/823 |
| 5,612,826 A | * | 3/1997 | Ohshita | 359/819 |
| 6,008,954 A | * | 12/1999 | Shintani et al. | 359/704 |
| 6,781,772 B2 | * | 8/2004 | Miyawaki | 359/819 |
| 7,359,131 B1 | * | 4/2008 | Gutierrez et al. | 359/819 |
| 2006/0109668 A1 | | 5/2006 | Schmieder et al. | |

OTHER PUBLICATIONS

U.S. Appl. No. 11/487,908, filed Jul. 17, 2006, Gutierrez et al.
U.S. Appl. No. 11/511,001, filed Aug. 28, 2006, Gutierrez et al.
U.S. Appl. No. 11/847,547, filed Aug. 30, 2007, Gutierrez et al.
U.S. Appl. No. 11/364,099, filed Feb. 28, 2006, Tang et al.

* cited by examiner

*Primary Examiner*—Mohammed Hasan
(74) *Attorney, Agent, or Firm*—Haynes and Boone, LLP

(57) ABSTRACT

Various lens barrels and lenses are provided which may be used in miniature cameras. In one example, a lens barrel assembly includes a substantially cylindrical lens barrel with a first end including a first aperture and a second end including a second aperture. The first end further includes a first substantially annular portion having a first diameter and a first external surface. The first end also includes a second substantially annular portion having a second diameter and a second external surface. The second diameter is smaller than the first diameter and greater than a diameter of the first aperture. The first external surface of the first substantially annular portion is recessed in relation to the second external surface of the second substantially annular portion. The lens barrel assembly may also include a lens having a portion that protrudes from the second aperture of the second end of the housing.

12 Claims, 4 Drawing Sheets

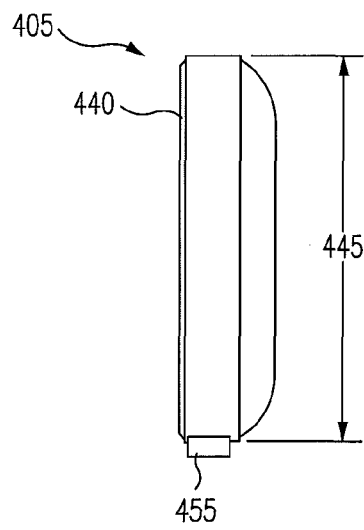
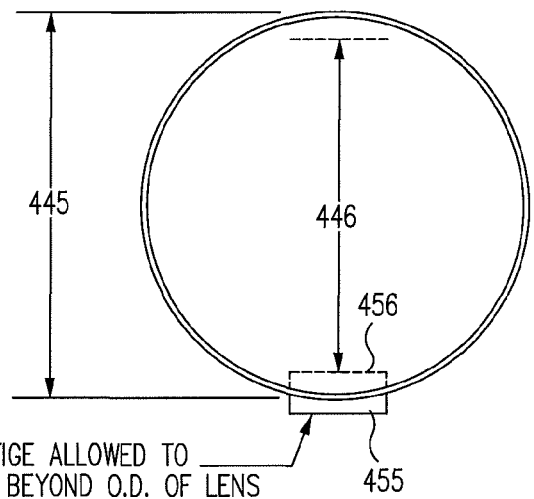
FIG. 5A
GATE VESTIGE ALLOWED TO PROTRUDE BEYOND O.D. OF LENS
FIG. 5B
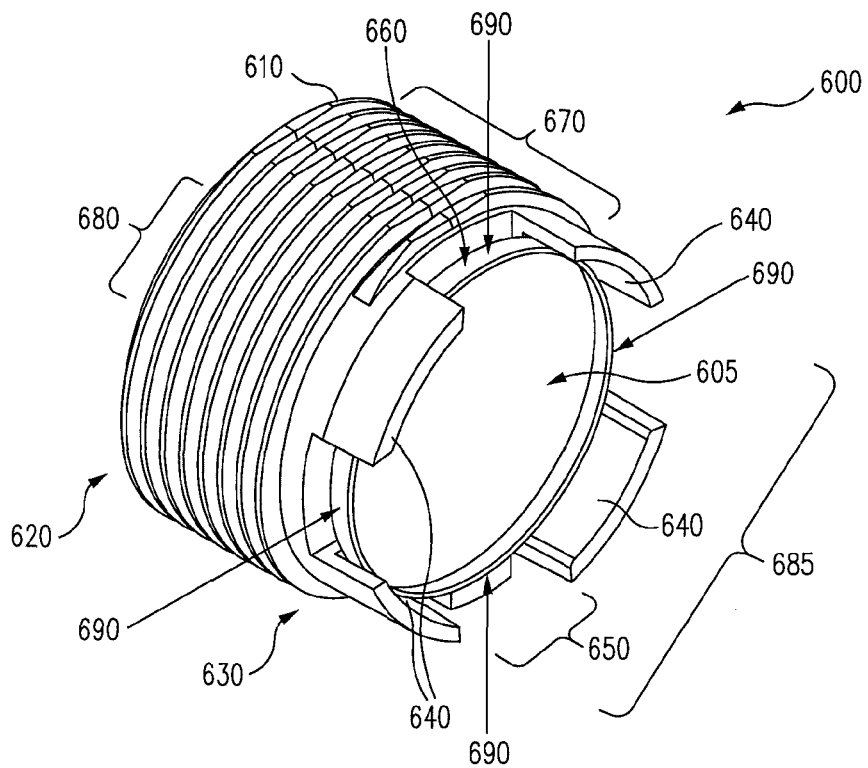
FIG. 6

LENS BARREL ASSEMBLY

BACKGROUND

1. Technical Field

The invention generally relates to lenses and lens barrels for use with miniature cameras.

2. Related Art

Various personal electronic devices are often implemented with miniature cameras. Such cameras may include, for example, a lens barrel assembly that includes a lens barrel with one or more lenses that pass light to an image capture device, such as an image sensor. However, as ever-smaller personal electronic devices are produced, the size of their corresponding miniature cameras must be reduced. Unfortunately, existing lens barrels and their associated lenses can be a limiting factor in reducing the size of such cameras.

For example, certain conventional lens barrels may fully enclose all lenses of a miniature camera. Such implementations require a corresponding minimum lens barrel size that is sufficient to surround all of the lenses. Conventional lens barrels may also be implemented with a uniform diameter corresponding to the diameter of the largest lens of the camera. Such designs fail to efficiently utilize the limited space available in applications utilizing miniature cameras.

Lens barrel configurations can also impact the size of lenses which may be used in miniature cameras. For example, lenses may be inserted into conventional cylindrical lens barrels by tools configured to grip the outer surfaces of the lenses. However, in order to permit insertion of such lenses into a conventional cylindrical lens barrel, the lenses may be implemented with a useable diameter that is smaller than the interior diameter of the lens barrel. This smaller diameter provides clearance between the lens and the interior surfaces of the lens barrel to permit insertion of a lens gripping tool while a lens is inserted into the lens barrel. Alternatively, such lenses may be implemented with flattened external surfaces to provide sufficient clearance for such tools. In each of these cases, the useable diameter of the lens will be reduced without a corresponding reduction in the overall size of the lens barrel assembly.

In addition, lenses produced by injection molding manufacturing processes typically include gate vestiges which remain part of the lens. In order to permit insertion of these lenses into conventional cylindrical lens barrels, the lenses may be manufactured to include such gate vestiges within the diameter of the lens. However, in such implementations, the useable diameter of the lens will be reduced to include only the remaining interior diameter of the lens that does not include the gate vestige. Similar to techniques described above, the useable diameter of the lens will be reduced without a corresponding reduction in the size of the lens barrel assembly.

SUMMARY

In accordance with one embodiment of the invention, a lens barrel assembly of a miniature camera includes a substantially cylindrical lens barrel housing comprising: a first end comprising: a first aperture, a first substantially annular portion having a first diameter and a first external surface, a second substantially annular portion having a second diameter and a second external surface, wherein the second diameter is smaller than the first diameter and greater than a diameter of the first aperture, wherein the first external surface of the first substantially annular portion is recessed in relation to the second external surface of the second substantially annular portion; and a second end comprising a second aperture.

In accordance with another embodiment of the invention, a lens barrel assembly of a miniature camera includes a substantially cylindrical lens barrel housing comprising: a first end comprising a first aperture, and a second end comprising a second aperture; and a lens comprising: a first portion substantially encircled and partially enclosed by the housing to secure the lens to the housing, and a second portion that protrudes from the second aperture of the second end of the housing.

In accordance with another embodiment of the invention, a lens barrel assembly of a miniature camera, includes a substantially cylindrical lens barrel housing comprising: a first end comprising a first aperture, a second end comprising a second aperture, and a plurality of prongs that project from the second end of the housing; and a lens secured to the housing by the prongs, wherein the lens has a useable diameter approximately equal to an interior diameter of the housing.

In accordance with another embodiment of the invention, a lens barrel assembly of a miniature camera, includes an injection-molded lens comprising: a substantially circular portion, and a gate vestige attached to the substantially circular portion; and a substantially cylindrical housing comprising: a first end comprising a first aperture, and a second end comprising: a second aperture adapted to receive the substantially circular portion of the lens, and a cutout adapted to receive the gate vestige of the lens.

These and other features and advantages of the invention will be more readily apparent from the detailed description of the embodiments set forth below taken in conjunction with the accompanying drawings.

BRIEF DESCRIPTION OF THE FIGURES

FIGS. 5A-B show side and front views of a lens that may be used with the lens barrel assembly of FIG. 4 in accordance with an embodiment of the invention.

FIG. 6 shows a perspective view of yet another lens barrel assembly in accordance with an embodiment of the invention.

Like element numbers in different figures represent the same or similar elements.

DETAILED DESCRIPTION

Figure 1:
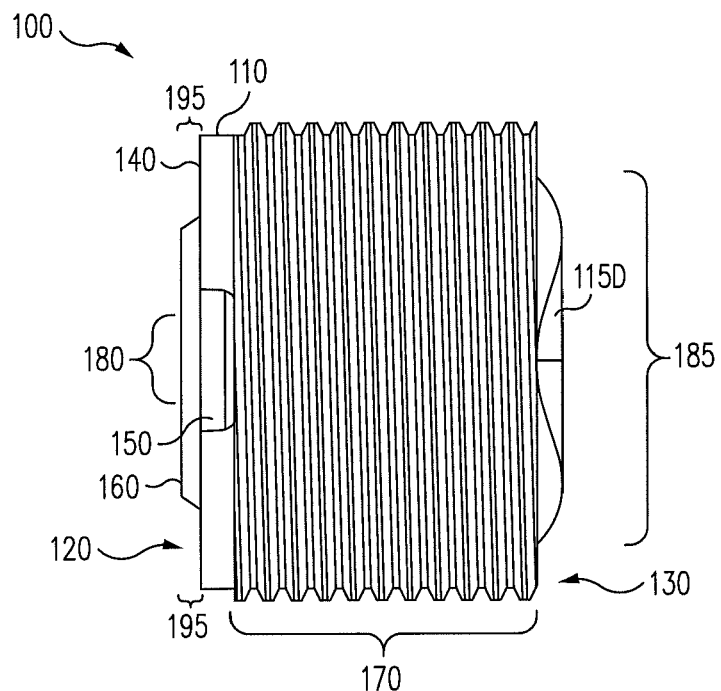
FIG. 1 shows a side view of a lens barrel assembly in accordance with an embodiment of the invention.
Figure 2:
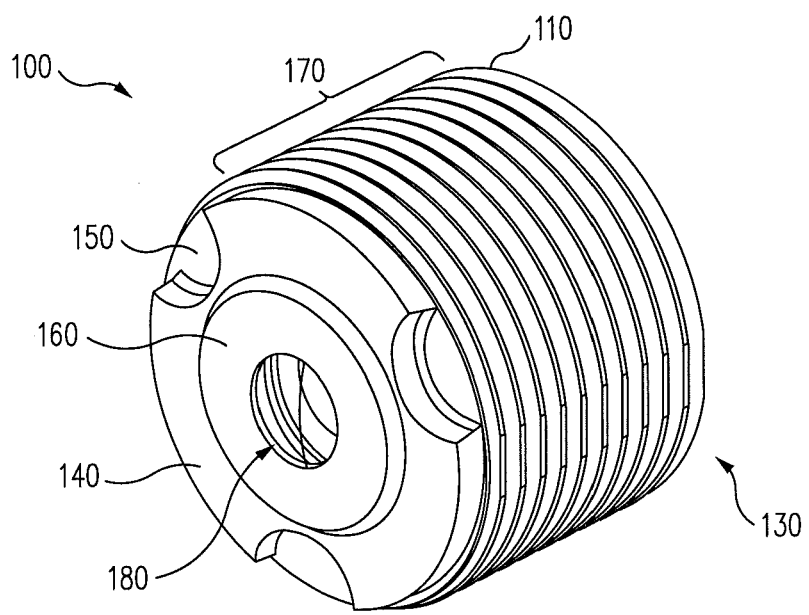
FIG. 2 shows a perspective view of the lens barrel assembly of FIG. 1 in accordance with an embodiment of the invention.
Figure 3:
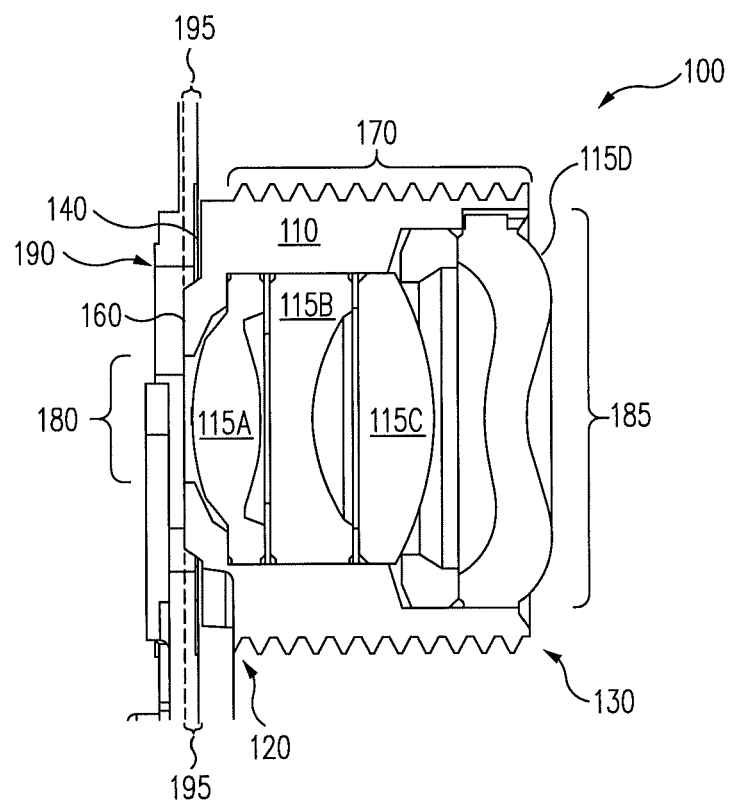
FIG. 3 shows a cross-sectional view of the lens barrel assembly of FIG. 1 in accordance with an embodiment of the invention.

In accordance with embodiments further described herein, various lens barrel assemblies are provided which may be used in miniature cameras included in, for example, personal electronic devices. Referring now to the drawings wherein the showings are for purposes of illustrating embodiments of the invention only, and not for purposes of limiting the same, FIGS. 1-3 show various views of a lens barrel assembly 100 in accordance with an embodiment of the invention. Lens barrel assembly 100 includes a substantially cylindrical lens barrel housing 110 having a front end 120 and a back end 130. In one embodiment, housing 110 may be implemented using a plastic material. Front end 120 includes an aperture 180, a first substantially annular portion 140, and a second substantially annular portion 160.

FIG. 2 illustrates the external surfaces of first and second annular portions 140 and 160. In this regard, it will be appreciated that first and second annular portions 140 and 160 have different diameters, wherein the diameter of second annular portion 160 is smaller than the diameter of first annular portion 140, and is greater than the diameter of aperture 180.

As shown in FIGS. 1-3, the external surface of first annular portion 140 is recessed in relation to the external surface of second annular portion 160. As further shown in FIGS. 1 and 3, this recessed configuration provides gaps 195 which may receive a component of a miniature camera positioned adjacent to housing 110. For example, as shown in FIG. 3, a component 190 (illustrated as a shutter in this example) of a miniature camera may be positioned within gaps 195. As a result, the overall size of a miniature camera which includes lens barrel assembly 110 may be reduced.

As shown in the cross-sectional view of FIG. 3, lens barrel assembly 100 may further include a plurality of lenses 115A-C enclosed by and mounted within housing 110. Although three lenses 115A-C are illustrated in FIG. 3, it will be appreciated that any desired number of lenses may be included in lens barrel assembly 100. Upon inspection of FIG. 3, it will be appreciated lens 115A has a diameter smaller than the diameter of first annular portion 140. In addition, second annular portion 160 is configured to receive lens 115A. Accordingly, it will be appreciated that lens 115A may be positioned so as to at least partially protrude into second annular portion 160. In addition, it will be further appreciated that component 190 may at least partially encircle lens 115A.

Housing 110 includes a plurality of threads 170 which may be used to screw lens barrel assembly 100 into a lens mount configured to hold lens barrel assembly 100. In this regard, first annular portion 140 may further include a plurality of indentations 150 adapted to receive an appropriate tool operable to screw lens barrel assembly 100 into a lens mount.

As also shown in FIGS. 1 and 3, back end 130 of housing 110 includes an aperture 185 through which a lens 115D at least partially protrudes from housing 110. In this regard, lens barrel assembly 100 further includes lens 115D which has a first portion that is substantially encircled and partially enclosed by housing 110, and a second portion that protrudes from aperture 185. Advantageously, by configuring housing 110 to encircle only a portion of lens 115D, the overall length of housing 110 may be reduced.

Figure 4:
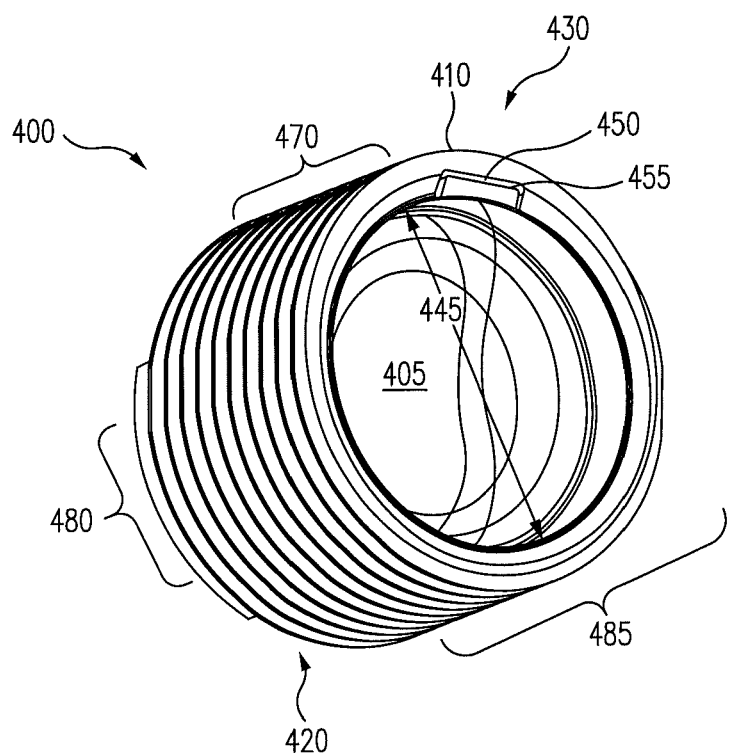
FIG. 4 shows a perspective view of another lens barrel assembly in accordance with an embodiment of the invention.

FIG. 4 shows a perspective view of a lens barrel assembly 400 in accordance with an embodiment of the invention. Similar to the embodiments described in FIGS. 1-3, lens barrel assembly 400 includes a substantially cylindrical lens barrel housing 410 having a front end 420 that includes an aperture 480, and a back end 430 that includes an aperture 485. Lens barrel assembly 400 may also include a plurality of lenses enclosed by and mounted within housing 410. In addition, housing 410 includes a plurality of threads 470 which may be used to screw lens barrel assembly 400 into a lens mount configured to hold lens barrel assembly 400. In one embodiment, housing 410 may be implemented using a plastic material.

Lens barrel assembly 400 further includes a lens 405 which may be mounted in back end 430 of housing 410 through aperture 485. FIGS. 5A-B show side and front views of lens 405 that may be used with lens barrel assembly 400 in accordance with an embodiment of the invention. Lens 405 may be implemented as an injection-molded lens using, for example, a plastic material. In this regard, lens 405 includes a substantially circular portion 440 as well as a gate vestige 455 attached to circular portion 440. It will be appreciated that gate vestige 455 may be excess material resulting from an injection molding process used to form lens 405.

In contrast to various known lens formation techniques, gate vestige 455 of lens 405 is not contained within a diameter 445 of circular portion 440. Rather, gate vestige extends outside diameter 445. In this regard, it will be appreciated that if a gate vestige were included within the diameter of circular portion 440 (shown by gate vestige 456 illustrated in broken lines), then the useable diameter of lens 405 would shrink to diameter 446. However, because gate vestige 455 extends outside diameter 445, the useable diameter of lens 405 may approximately coincide with diameter 445.

Turning again to FIG. 4, back end 430 of housing 410 further includes a cutout 450 which may receive gate vestige 455 of lens 405. In one embodiment, diameter 445 of circular portion 440 of lens 405 may be approximately equal to a diameter of aperture 485 of back end 430 of housing 410. Advantageously, because housing 410 includes cutout 450, the entirety of lens 405 may be inserted into housing 410, with the diameter 445 of lens 405 approximately coinciding with the diameter of aperture 485. It will be appreciated that such a configuration can increase useable lens diameters over prior approaches in which gate vestiges are included within lens diameters.

As a result of the configuration shown in FIG. 4, the diameter of lens barrel assembly 400 can be reduced without an associated loss of useable lens diameter. For example, in one embodiment, the diameter of lens barrel assembly 400 may be reduced to approximately 5 mm when used with ¼ inch imagers having approximately 2 or 3 Mpixels. In another embodiment, the diameter of lens barrel assembly 400 may be reduced to approximately 6 mm when used with 1/3.2 inch imagers having approximately 2 or 3 Mpixels.

FIG. 6 shows a perspective view of a lens barrel assembly 600 in accordance with an embodiment of the invention. Similar to the embodiments described in FIGS. 1-4, lens barrel assembly 600 includes a substantially cylindrical lens barrel housing 610 having a front end 620 that includes an aperture 680, and a back end 630 that includes an aperture 685. Lens barrel assembly 600 may also include a plurality of lenses enclosed by and mounted within housing 610. In addition, housing 610 includes a plurality of threads 670 which may be used to screw lens barrel assembly 600 into a lens mount configured to hold lens barrel assembly 600. In one embodiment, housing 610 may be implemented using a plastic material.

Lens barrel assembly 600 further includes a plurality of prongs 640 that project from back end 630 of housing 610. In one embodiment, prongs 640 may be integrated with housing 610 as a monolithic structure, while in another embodiment prongs 640 may be implemented as separate structures attached to housing 610.

A lens 605 is secured to housing 610 by prongs 640 which may grip an arcuate outer surface 660 of lens 605. As also shown, a plurality of spaces 650 between prongs 640 expose portions of outer surface 660 of lens 605 and can facilitate the mounting of lens 605 in relation to housing 610. For example, in one embodiment, spaces 650 may be configured to receive a tool operable to insert lens 605 into prongs 640. In this regard, it will be appreciated that such a tool may apply force in the directions of one or more of arrows 690 against portions of outer surface 660 exposed between spaces 650 to grip portions of outer surface 660 for inserting lens 605 into prongs 605.

Advantageously, because portions of outer surface 660 of lens 605 can remain gripped by an appropriate tool during insertion into prongs 640, such a tool is not required to protrude into the cylindrical portion of housing 610. Therefore, gaps between the diameter of lens 605 and the diameter of aperture 685 need not be provided. As a result, lens 605 may be implemented with a diameter approximately equal to an interior diameter of housing 610, such as approximately equal to aperture 685.

Figure 7:
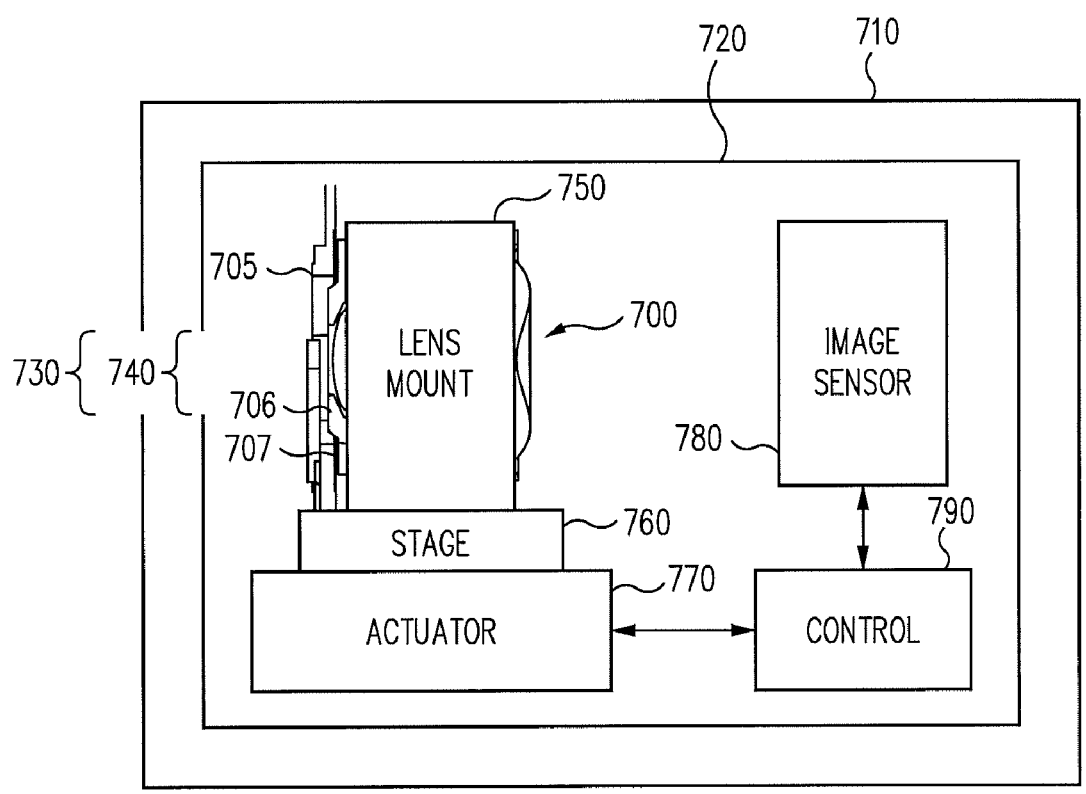
FIG. 7 shows a block diagram of a personal electronic device including a miniature camera in accordance with an embodiment of the invention.

FIG. 7 shows a block diagram of a personal electronic device 710 including a miniature camera 720 in accordance with an embodiment of the invention. Personal electronic device 710 may be a portable computer, a laptop computer, a notebook computer, a pocket personal computer (pocket PC), a personal digital assistant (PDA), a mobile telephone, or other device including camera 720. Camera 720 may be implemented, for example, as a digital still camera or a digital video camera with an adjustable focus.

Device 710 and camera 720 include apertures 730 and 740, respectively, which may receive light reflected from external objects. As shown, camera 720 includes a lens barrel assembly 700, a shutter 705, a lens mount 750, a stage 760, an actuator 770, an image sensor 780, and a control block 790. Light received through apertures 730 and 740 passes through one or more lenses of lens barrel assembly 700 and is captured by image sensor 780.

Although lens barrel assembly 700 is illustrated in FIG. 7 in a manner similar to the embodiments of FIGS. 1-3, it will be appreciated that any of the lens barrel assembly embodiments disclosed herein may be used for lens barrel assembly 700. As shown in FIG. 7, lens barrel assembly may be implemented with a first annular portion 707 that is recessed in relation to a second annular portion 706 to provide gaps as similarly described above with regard to the embodiments of FIGS. 1-3. As a result, at least a portion of shutter 705 may be positioned within the gaps, thereby reducing the space within camera 720 used to contain shutter 705.

Actuator 770 may be in electrical, mechanical, and/or electro-magnetic communication with stage 760 for controlling the position of stage 760. In this regard, actuator 770 may be implemented in accordance with any appropriate mechanism for providing controlled movements on a scale appropriate for device 710. For example, in various embodiments, actuator 770 may be implemented as a Lorentz motor, a micro-electro-mechanical systems (MEMS) device, or other appropriate apparatus such as, for example, those disclosed in U.S. patent application Ser. No. 11/190,307 filed on Jul. 26, 2005 and entitled "MEMS Digital Linear Actuator" which is incorporated herein by reference, or those disclosed in U.S. patent application Ser. No. 11/263,149 filed on Oct. 31, 2005 and entitled "Lorentz Actuator For Miniature Camera" which is incorporated herein by reference.

Stage 760 may be translated toward or away from image sensor 780 by actuator 770. Image sensor 780 may implemented using any appropriate technology for capturing digital images such as, for example, a charge-coupled device (CCD) or complimentary metal-oxide semiconductor (CMOS) device. Images captured by image sensor 780 can be provided to one or more control blocks 790 which may be implemented with appropriate hardware and/or software to control actuator 770 and process the images.

Other embodiments are also contemplated. For example, although various lenses have been described herein as being implemented using a plastic material, glass or other materials may be used where appropriate. In addition, various sizes and diameters of lenses and lens barrel assemblies are contemplated. For example, in certain embodiments, lenses and lens barrel assemblies may be implemented with diameters in the range of approximately 4 to 6 mm, however, it will be appreciated that any desired dimensions may be used in accordance with the present disclosure where appropriate.

In view of the present disclosure, it will be appreciated that various improvements to lens barrels and lenses are provided which may be used with miniature cameras, such as those incorporated into personal electronic devices. For example, by permitting lenses to protrude from an end of a lens barrel, the length of the lens barrel may be abridged, thereby reducing the volume and weight of the lens barrel. In addition, by providing a recessed external surface at an end of a lens barrel, components of a miniature camera may be placed in closer proximity to each other.

Various other embodiments described herein increase the useable diameter of lenses, such as injection-molded lenses, by permitting gate vestiges to protrude out from substantially circular portions of the lenses. Lens barrels may be implemented with cutouts to accommodate the gate vestiges. As a result, lenses may be implemented with a desired useable diameter that corresponds to an inside diameter of the lens barrel. The inside diameter of such lens barrels can therefore be reduced to correspond to the useable diameter of the lenses, rather than a diameter that includes the gate vestiges.

Other embodiments disclosed herein may be implemented to permit the securing of lenses to lens barrels without requiring additional clearance between the lenses and the interior surfaces of the lens barrel. As a result, the diameter of such lens barrels can be reduced. In particular, by providing lens barrels with appropriate prongs and spaces therebetween, appropriate tools may be used to insert the lenses into the prongs without requiring such tools to be inserted between the lenses and the interior surfaces of the lens barrel.

Where applicable, the various components set forth herein can be combined into composite components and/or separated into sub-components without departing from the spirit of the invention. Similarly, where applicable, the ordering of various steps described herein can be changed, combined into composite steps, and/or separated into sub-steps to provide features described herein.

The foregoing disclosure is not intended to limit the invention to the precise forms or particular fields of use disclosed. It is contemplated that various alternate embodiments and/or modifications to the invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the following claims.

What is claimed is:

1. A lens barrel assembly of a miniature camera, the lens barrel assembly comprising:
a substantially cylindrical lens barrel housing comprising:
a first end comprising:
a first aperture,
a first substantially annular portion having a first external diameter and a first external surface, wherein the first external surface is substantially perpendicular to a length of the lens barrel housing,
a second substantially annular portion having a second external diameter and a second external surface, wherein the second external surface is substantially perpendicular to the length of the lens barrel housing, wherein the second external diameter is smaller than the first external diameter and greater than a diameter of the first aperture, wherein the first aperture is in the second substantially annular portion, wherein the first external surface of the first substantially annular portion is recessed along the length of the lens barrel housing in relation to the second external surface of the second substantially annular portion, and a lens having a third diameter larger than the second external diameter, wherein the lens at least partially protrudes from the first substantially annular portion into the second substantially annular portion; and a second end comprising a second aperture.

2. The lens barrel assembly of claim 1, wherein the first substantially annular portion is adapted to receive a component of a miniature camera positioned adjacent to the first external surface of the first substantially annular portion and at least partially encircling the lens.

3. The lens barrel assembly of claim 1, further comprising a plurality of indentations in the first external surface of the first substantially annular portion, wherein the detents are adapted to receive a tool operable to screw the lens barrel into a lens mount.

4. The lens barrel assembly of claim 1, wherein the housing is comprised of plastic.

5. The lens barrel assembly of claim 1, wherein the miniature camera is part of a personal electronic device.

6. The lens barrel assembly of claim 1, wherein the lens is a first lens, the lens barrel assembly further comprising a second lens comprising:

a first portion substantially encircled and partially enclosed by the housing to secure the lens to the housing; and a second portion that protrudes from the second aperture of the second end of the housing.

7. The lens barrel assembly of claim 1, wherein the lens is a first lens, the lens barrel assembly further comprising:

a plurality of prongs that project from the second end of the housing; and a second lens secured to the housing by the prongs.

8. The lens barrel assembly of claim 7, wherein the prongs define a plurality of spaces between the prongs, wherein the spaces are adapted to receive a tool operable to insert the lens into the prongs.

9. The lens barrel assembly of claim 7, wherein the prongs are integrated with the housing.

10. The lens barrel assembly of claim 7, wherein the second lens is an injection-molded lens.

11. The lens barrel assembly of claim 1, wherein:
the lens is a first lens;
the lens barrel assembly further comprises a second lens, wherein the second lens is an injection-molded lens comprising:
a substantially circular portion, and
a gate vestige attached to the substantially circular portion; and
the lens barrel housing comprises a cutout adapted to receive the gate vestige of the second lens.

12. The lens barrel assembly of claim 11, wherein a diameter of the substantially circular portion of the lens corresponds to a useable diameter of the second lens.

* * * * *